United States Patent [19]

Tatsuta et al.

[11] Patent Number: 5,220,779
[45] Date of Patent: Jun. 22, 1993

[54] CABLE DRAG CHAIN HAVING INTERNAL PARTITIONING

[75] Inventors: Kiyotake Tatsuta, Sakai; Hiroshi Yasuda, Ibaraki; Shoichiro Komiya, Kobe; Hiroshi Nishimura, Osaka, all of Japan

[73] Assignee: Tsubakimoto Chain Co., Osaka, Japan

[21] Appl. No.: 917,161

[22] Filed: Jul. 20, 1992

[30] Foreign Application Priority Data

Jul. 31, 1991 [JP] Japan ................ 3-67379[U]

[51] Int. Cl.$^5$ ............................................ F16G 13/16
[52] U.S. Cl. ................................... 59/78.1; 59/900; 248/49
[58] Field of Search .................... 59/78, 78.1, 900; 248/49

[56] References Cited

U.S. PATENT DOCUMENTS

| | | | |
|---|---|---|---|
| 3,716,986 | 2/1973 | Cork et al. | 59/78.1 |
| 4,104,871 | 8/1978 | Moritz | 59/78.1 |
| 4,198,812 | 4/1980 | Hennig et al. | 59/78.1 |
| 4,570,437 | 2/1986 | Moritz | 59/78.1 |
| 4,625,507 | 12/1986 | Moritz et al. | 59/78.1 |
| 4,658,577 | 4/1987 | Klein | 59/78.1 |
| 4,833,876 | 5/1989 | Kitao et al. | 59/78.1 |
| 5,108,350 | 4/1992 | Szpakowski | 59/78.1 |

FOREIGN PATENT DOCUMENTS 286442A 10/1988 European Pat. Off. .

*Primary Examiner*—David Jones
*Attorney, Agent, or Firm*—Howson and Howson

[57] ABSTRACT

A cable drag chain, for supporting and guiding energy supply cables, hydraulic hoses or the like, connected between a fixed point and a linearly movable body, comprises a series of links flexibly connected together, each link including a pair of opposed link plates fixed in parallel relation by connecting rods to form an interior space communicating with corresponding interior spaces of connecting links. Internal partitioning structure separates the interior space of each link into vertically and laterally related channels for accommodating the cables. Sleeves rotatable in the structure provide rolling contact with cables.

3 Claims, 5 Drawing Sheets

CABLE DRAG CHAIN HAVING INTERNAL PARTITIONING

BRIEF SUMMARY OF THE INVENTION

This invention relates generally to cable drag chains, and more particularly to apparatus for vertical partitioning of the interior of a cable drag chain into upper and lower channels, or to apparatus for vertical partitioning into upper and lower channels, and lateral positioning into right and left channels, for supporting and guiding an energy supply cable, hydraulic hose or the like to a movable body.

Prior art cable drag chains typically include a series of links, each link consisting of pairs of opposed link plates, spaced in parallel relationships and flexibly connected to adjacent links by connecting rods for accommodating cables within an internal channel formed by the connected links. In prior art cable drag chains, the space within the channel is not effectively utilized.

An object of the present invention is to provide more effective use of the space for cables and the like, by partitioning the interior space into separate channels. In one embodiment, each link of the chain includes a pair of parallel-spaced and opposed link plates pivotally coupled end-to-end with adjacent link plates by pins to form an interior space accommodating flexible conduits such as cables and hoses. A horizontal member within each link vertically partitions the space into upper and lower cable-accommodating channels. In another embodiment, the ends of the horizontal member are rotatably supported by the link plates and slidably extend through at least one vertical member which partitions the interior space laterally into separate side-by-side channels. Protective sleeves may be slidably mounted on sections of the horizontal member separating adjacent upper and lower channels.

Generally, as a cable drag chain bends and moves through a U-turn, the length of the sides in the curved portion of the U-turn changes. At the same time, the speed on the internal side of the cable within the U-turn, relative to the horizontal partitioning member, is greater for larger diameter cables than for smaller diameter cables on the same rotatable member, even though each cable has the same axial length. Consequently, cables of different diameters in the upper channels will not roll freely over a horizontal member, and slippage occurs due to the different cable speeds where they engage the horizontal member. Therefore each protective sleeve is independently rotatable about the horizontal partitioning member to provide the cables in side-by-side channels substantially rolling contact on the horizontal member and thereby reduce slip, i.e. relative sliding movement between the cable and the partition.

DETAILED DESCRIPTION

Figure 1:
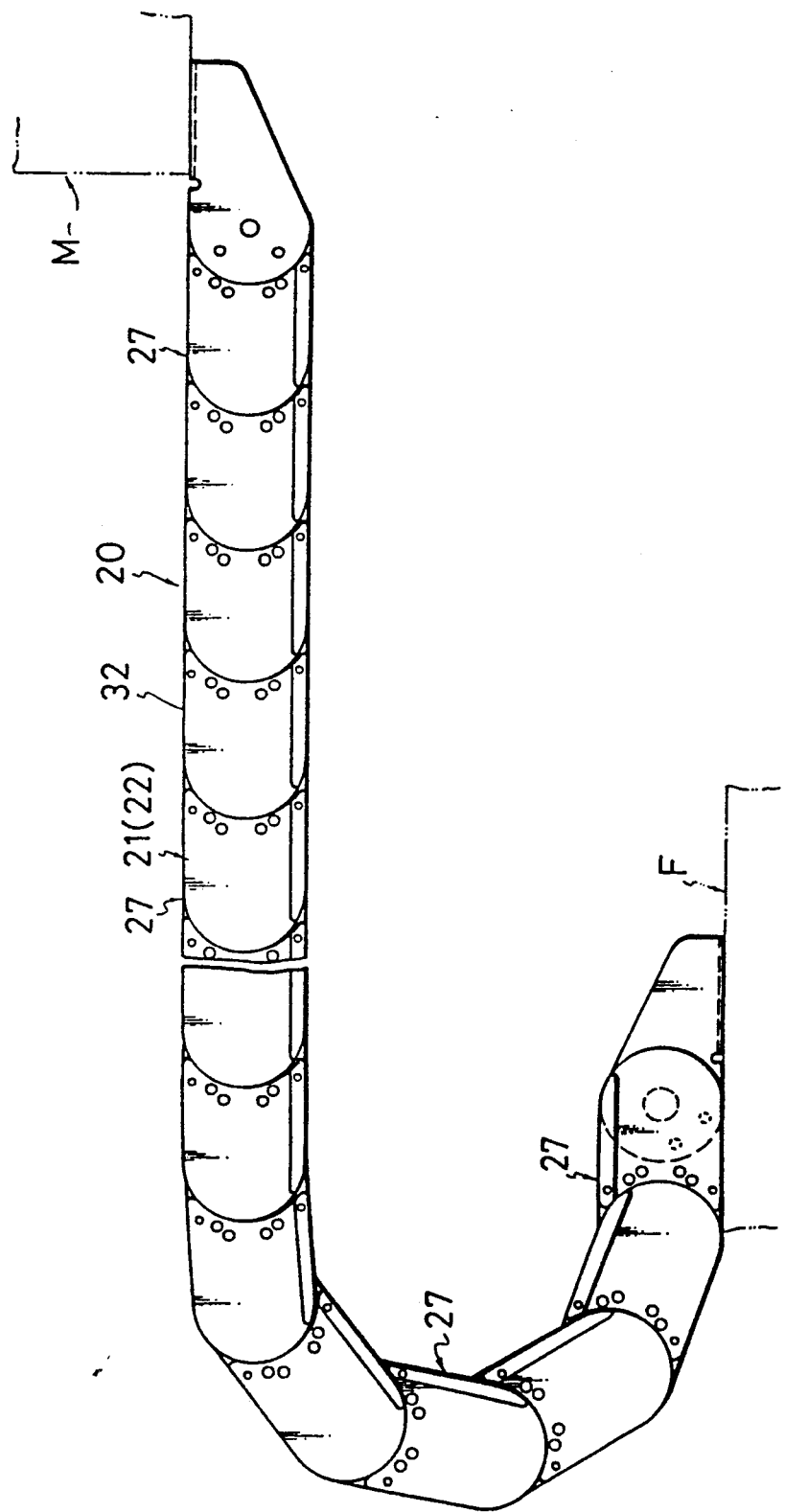
FIG. 1 is a side elevation of one embodiment of a cable drag chain according to the invention, arranged for connection between a movable carrier and the floor near a power source.

FIG. 1 shows a cable drag chain 20 suitable for the support, guidance and protection of cables transmitting power from a stationary power source near a stationary floor F to a linearly reciprocating machine M, such as a carriage for a heavy article. Of course, cable drag chain 20 may also be connected between two bodies movable linearly relative to each other.

As chain 20 bends and moves through a U-turn, the length of the sides of the curved portion of the U-turn changes, and a surface 32 located on the upper side of the cable drag chain moves to the lower side as machine M translates to the left. That is, an intermediate portion of cable drag chain 20 turns upside down.

Figure 2:
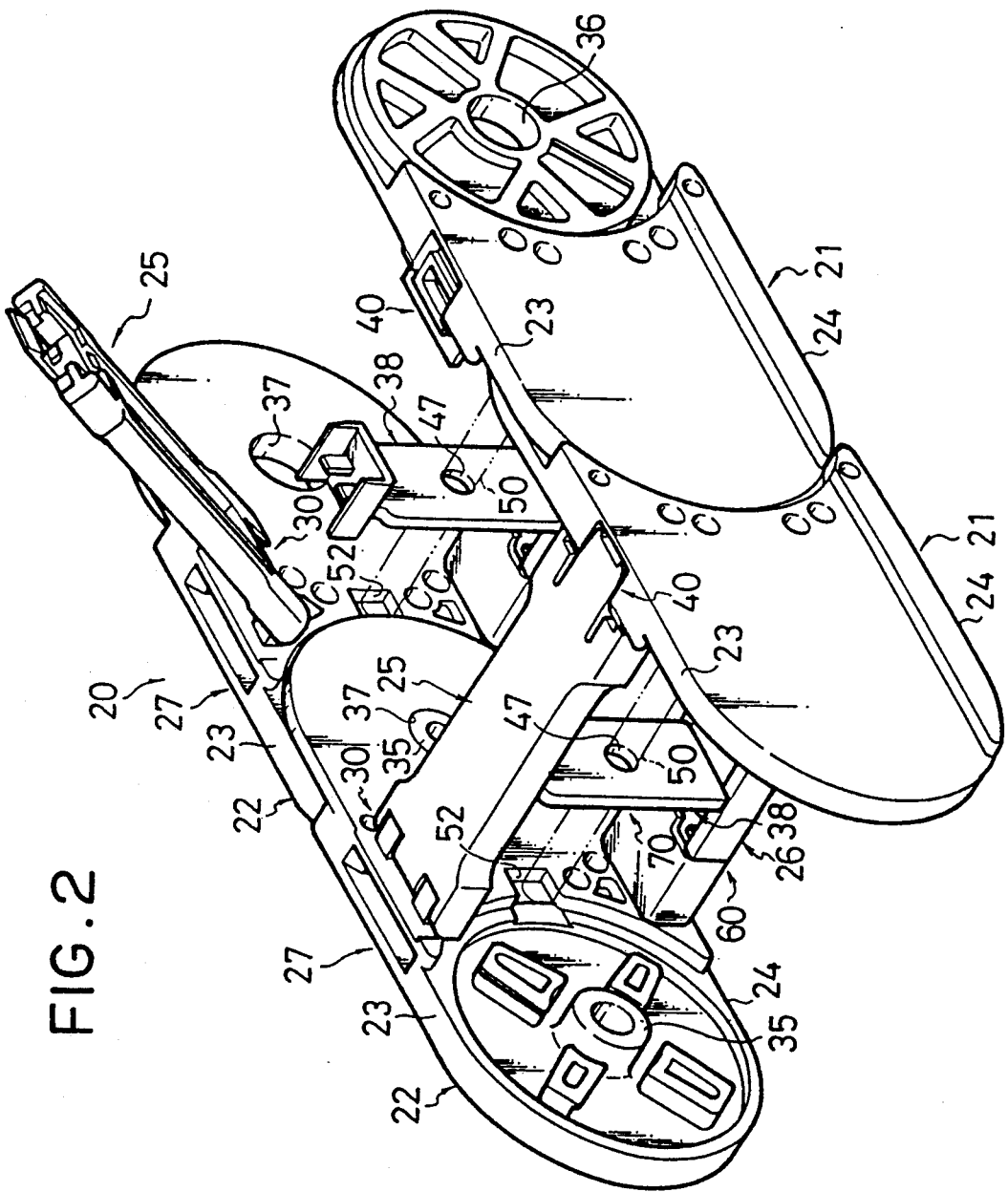
FIG. 2 is a perspective view of two connected links of the cable drag chain of FIG. 1 with a vertical member laterally partitioning the interior space of links according to the invention.
Figure 4:
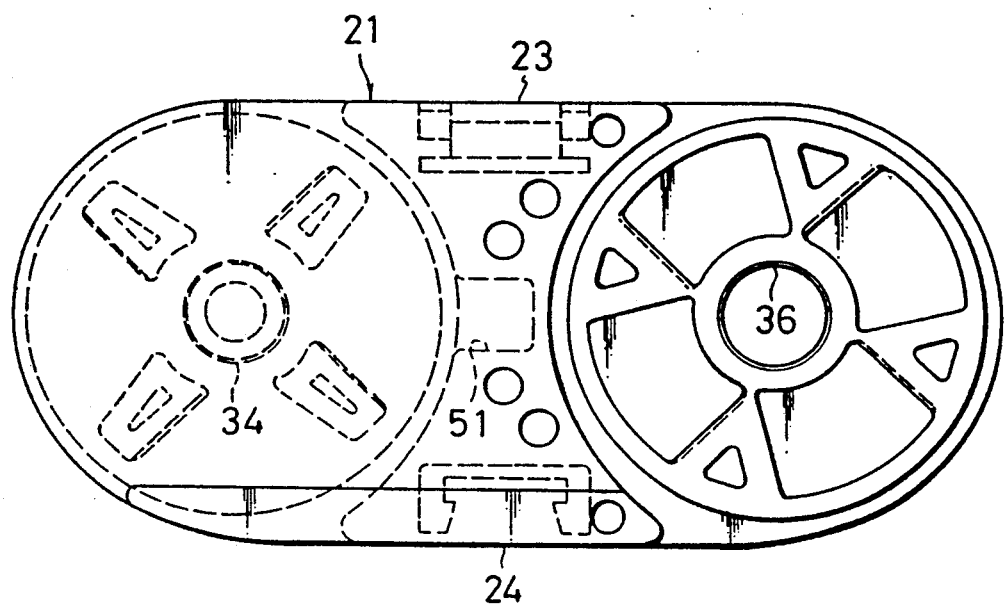
FIG. 4 is a side view of a link plate taken on plane 4—4 of FIG. 3.
Figure 5:
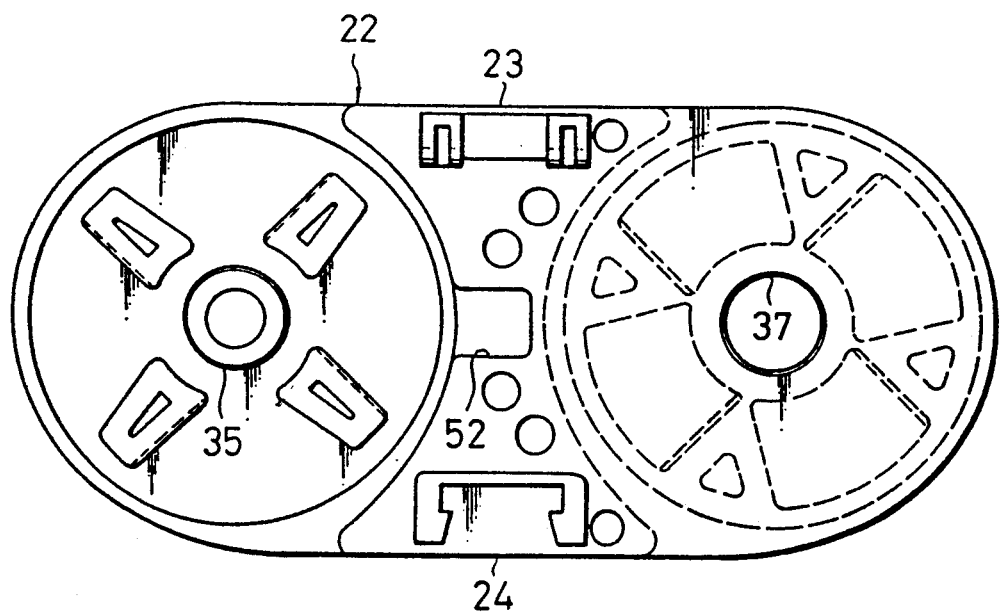
FIG. 5 is a side view of a link plate opposite to the link plate of FIG. 4 taken on plane 5—5 of FIG. 3.
Figure 6:
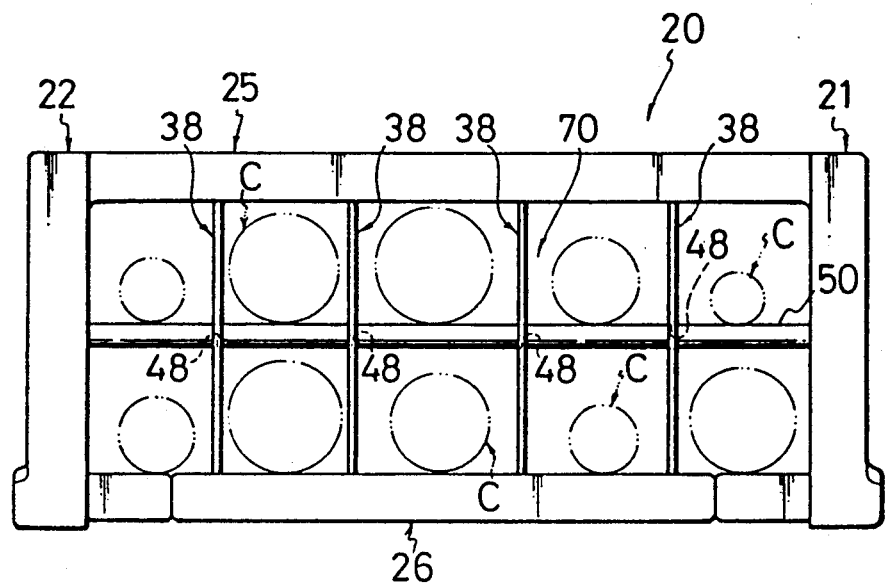
FIG. 6 is an end view of a link of FIG. 2, taken in the direction of the cable axes, illustrating both vertically and laterally partitioned channels according to the invention.

Referring to FIG. 2, cable drag chain 20 comprises a plurality of flexibly coupled links 27, each having a pair of spaced and opposed link plates 21 and 22 mutually connected at their upper sides 23 and lower sides 24 by upper and lower connecting rods 25 and 26. Hinge mechanisms 30 and snap mechanisms 40 detachably connect opposite ends of connecting rods 25 and 26 to link plates 21 and 22, respectively. Each link 27 is pivotally coupled to the next adjacent link 27 by connecting pins 34 (FIG. 4) and 35 by interengaging coaxial holes 36 and 37 of link plates 21 and 22, respectively.

Chain 20 is of the open type in which there is a clearance between upper connecting rods 25 and between lower connecting rods 26 of adjacent links. However, even a closed-type of chain, which is totally enclosed with no clearance between connecting rods, may include internal partitioning structure as described herein. Chain 20 may also be of an integral type in which there are no connecting rods.

Only upper and lower channels are thus formed by rod 50 unless members 38 are added. A plate-like vertical member 38 is provided for separating the interior space of link 27 into side-by-side channels as well. With more channels, it is possible to accommodate more cables in a given chain and thereby reduce the overall number of chains. Link plates 21, 22, connecting rods 25, 26 and vertical member 38, are preferably fabricated of molded resins.

Figure 3:
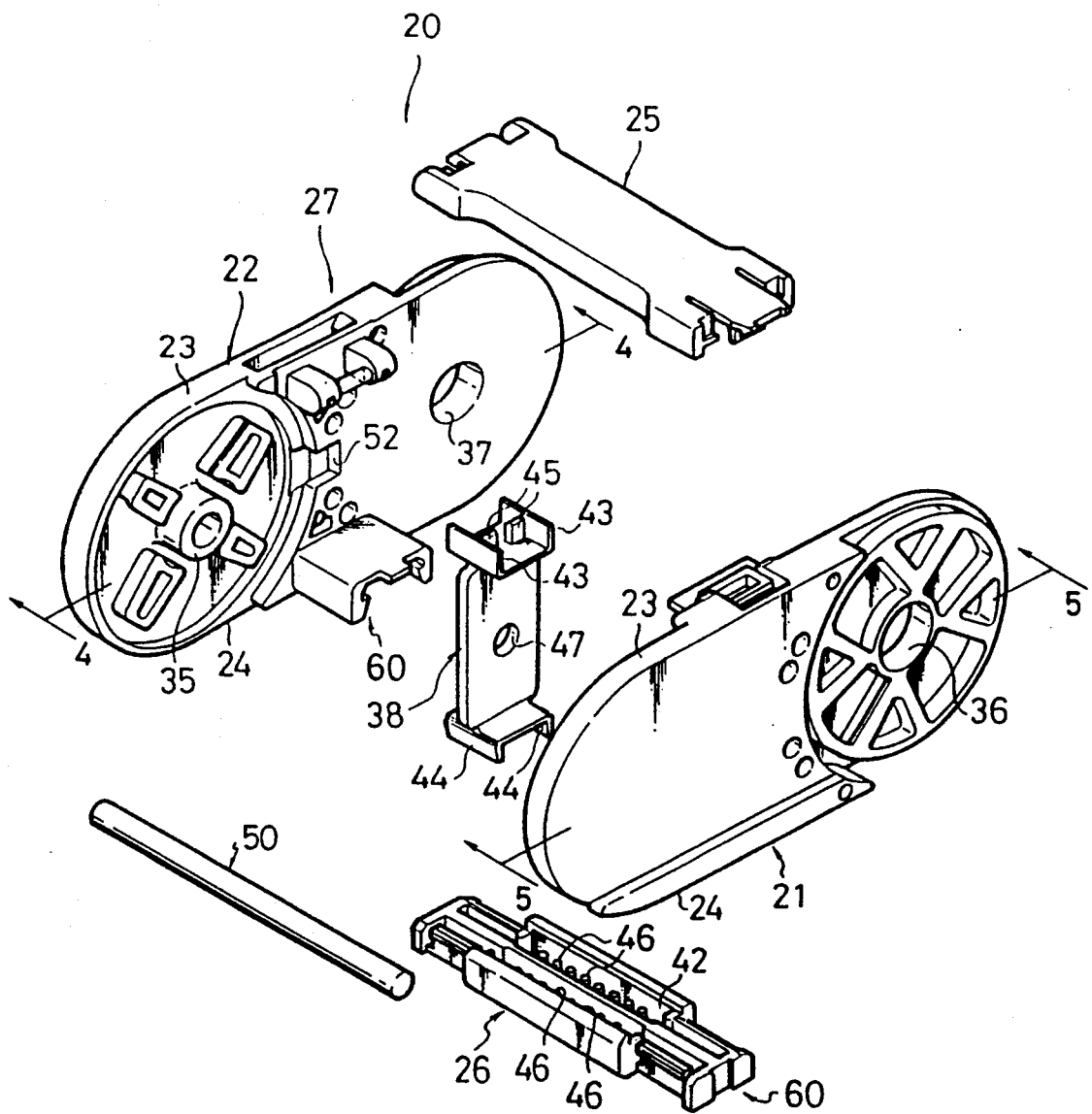
FIG. 3 is an exploded perspective view of one link according to the invention with both vertical and horizontal members for partitioning the interior space laterally and vertically.

As best seen in FIG. 3, vertical member 38 is secured between connecting rods 25 and 26. Pairs of legs 43 and 44, projecting from opposite ends of member 38, snap-engage into lengthwise recesses 41 (not shown) and 42 formed in facing sides of connecting rods 25 and 26, respectively. A pair of tabs 45, extending from the ends of member 38 between each pair of legs 43 and 44, interengages positioning pins 46 arranged in two rows in the recess 42 to fix the lateral position of member 38. Because the configurations of the opposite ends of member 38 are identical, it can be installed either end up.

A through hole 47, intermediate the length of member 38, receives a round, horizontal rod 50, preferably of aluminum or plastic, which is rotatably supported at both ends in recess 51 (FIG. 4) and recess 52 (FIG. 3) formed, respectively, in the facing surfaces of the link plates 21 and 22. Accordingly, the interior space of link 27 is partitioned into both upper and lower and side-by-side channels. More effective utilization of space is realized, and entanglement or damage to cables is reduced, due to sliding of the cables over rod 50 within the cable drag chain 20 as it turns upside down.

Horizontal rod 50 ma be rotatably supported in member 38 without the support of link plates 21 and 22, in which case recesses 51 and 52 are not required in link plates 21 and 22.

As described above, chain 20 generally bends and moves in a U-shape so that the lengths of the opposite side portions change relative to each other while maintaining the U-shape. Since the cables within the channels partitioned as described above have the same axial length irrespective of diameter, the internal side of the larger diameter cables move faster than smaller cables with respect to rods 50 within the U-shaped bent portion. Although rod 50 is rotatable, it cannot maintain rolling contact with different diameter cables within a channel due to the difference in their speeds at their point of contact with rod 50. Slip (sliding movement) inevitably occurs over rod 50.

Figure 7:
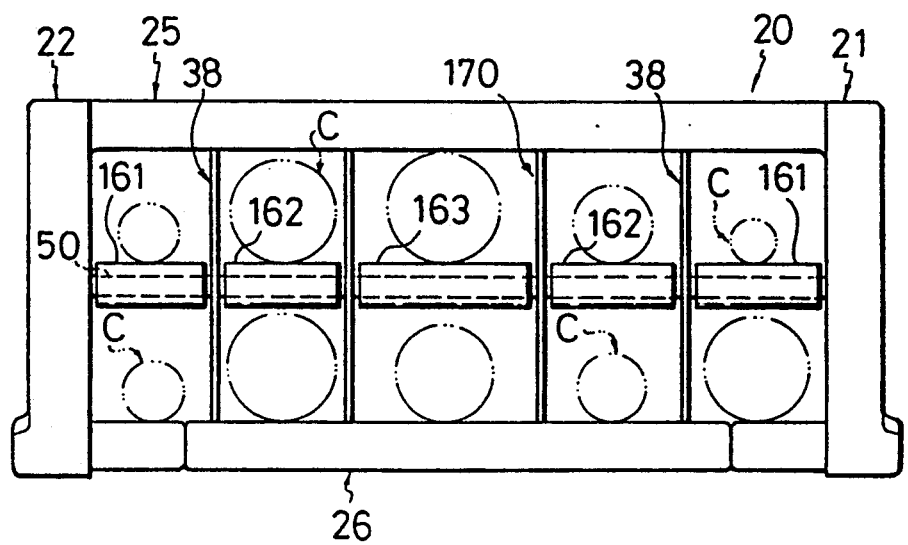
FIG. 7 is an end view of a link with protective sleeves mounted on horizontal members according to the invention.

This condition is alleviated by a partitioning structure 170, as shown in FIG. 7. The partitioning structure includes protective sleeves 161, 162, and 163 rotatably supported on rod 50 between link plates 21 or 22 and the adjacent member 38, or between adjacent members 38. Sleeves 161, 162 and 163 rotate independently of one another on rod 50, allowing rolling contact of the sleeves with the cables at different rotational speeds to reduce slip and smoothly allow the cables to bend at the U-shaped bent portion.

Some of the many advantages of the invention should now be readily apparent. The internal partitioning structure prevents entanglement of cables with each other and damage thereto caused by movement of the cable as an intermediate portion of the chain is turned upside down. Vertical and lateral partitioning of the space within the chain accommodates a number of cables for effective utilization of the space within the cable drag chain and prevents damage to the cables. With more cables accommodated, the number of cable drag chains required for a given application can be reduced. Vertical partitioning of the interior of the chain with rotatable horizontal members into upper and lower channels further reduces damage caused by sliding of the cable during movement of the cable drag chain and extends cable life. A protective body rotatable on the horizontal members between the adjacent upper and lower channels further reduces sliding movement of cables relative to the partition.

We claim:

1. A cable drag chain comprising:
    a plurality of link bodies, in which each link body comprises a pair of spaced and opposed link plates having facing surface with opposed recesses, and in which the link bodies are flexibly connected to accommodate cables or hoses within their interiors; and
    an internal partitioning structure comprising partitioning means, supported between said link plates in said opposed recesses in the facing surfaces thereof, for separating the interior of said cable drag chain into upper and lower channels, wherein said partitioning means is a round rod supported at both ends in said recesses on an axis transverse to the length of the chain.

2. A cable drag chain according to claim 1, wherein each of said recesses is formed at the longitudinally intermediate portion of a respective link plate.

3. A drag chain comprising:
    plurality of link bodies in which each link body comprises a pair of spaced and opposed link plates, and in which the link bodies are flexibly connected to accommodate flexible conduits within the interiors; and
    an internal partitioning structure comprising lateral partitioning means for separating the interior of said drag chain into laterally disposed channels, a rotatable vertical partitioning means extending through said lateral partitioning means for separating the laterally disposed channels into upper and lower parts, and protective means rotatable on said vertical partitioning means.

* * * * *